United States Patent [19]
Yasukawa et al.

[11] Patent Number: 5,085,005
[45] Date of Patent: Feb. 4, 1992

[54] WEATHER STRIP FOR MOTOR VEHICLE

[75] Inventors: Takemasa Yasukawa; Tadanobu Iwasa; Masanori Midooka, all of Inazawa, Japan

[73] Assignee: Toyoda Gosei Co., Ltd., Nishikasugai, Japan

[21] Appl. No.: 684,772

[22] Filed: Apr. 15, 1991

[30] Foreign Application Priority Data

May 14, 1990 [JP] Japan ............... 2-50010[U]
Aug. 7, 1990 [JP] Japan ............... 2-209850
Aug. 7, 1990 [JP] Japan ............... 2-209851

[51] Int. Cl.⁵ ............................. E05F 11/38
[52] U.S. Cl. ......................... 49/377; 49/477; 49/502
[58] Field of Search ............ 49/377, 502, 374, 477

[56] References Cited

U.S. PATENT DOCUMENTS

| | | | |
|---|---|---|---|
| 2,913,783 | 11/1959 | Bright | 49/377 X |
| 4,094,100 | 6/1978 | Fukumoto et al. | 49/377 X |
| 4,696,128 | 9/1987 | Fukuhara | 49/377 X |
| 4,949,507 | 8/1990 | Vaughan | 49/377 X |
| 4,976,067 | 12/1990 | Maass | 49/377 |

Primary Examiner—Philip C. Kannan
Attorney, Agent, or Firm—Cushman, Darby & Cushman

[57] ABSTRACT

A weather strip to be attached along a belt line of a door of a motor vehicle for wiping an outer surface of a door glass when the door glass is raised and lowered. The weather strip has a base portion to be attached along the belt line of a door outer panel, a lip extending from the base portion obliquely upwardly toward the door glass so that an end of the lip contacts the outer surface of the door glass, and a blade extending from the base portion under the lip in a direction of the outer surface of the door glass. An end of the blade contacts the outer surface of the door glass. When the door glass is raised and lowered, the blade turns upwardly and downwardly, thereby wiping the outer surface of the door glass. The blade has a projecting portion at an upper surface thereof for pushing up a lower surface of the lip and detaching the end of the lip from the outer surface of the door glass when the blade turns upwardly whereby water on the outer surface of the door glass can be completely wiped by the blade when the door glass is raised.

11 Claims, 11 Drawing Sheets

WEATHER STRIP FOR MOTOR VEHICLE

BACKGROUND OF THE INVENTION

1. Field of the Invention

The present invention relates to a weather strip for a motor vehicle, and more particularly to a weather strip to be attached along a door belt line of the motor vehicle for removing water from an outer surface of a door glass.

2. Description of the Prior Art

Figure 19:
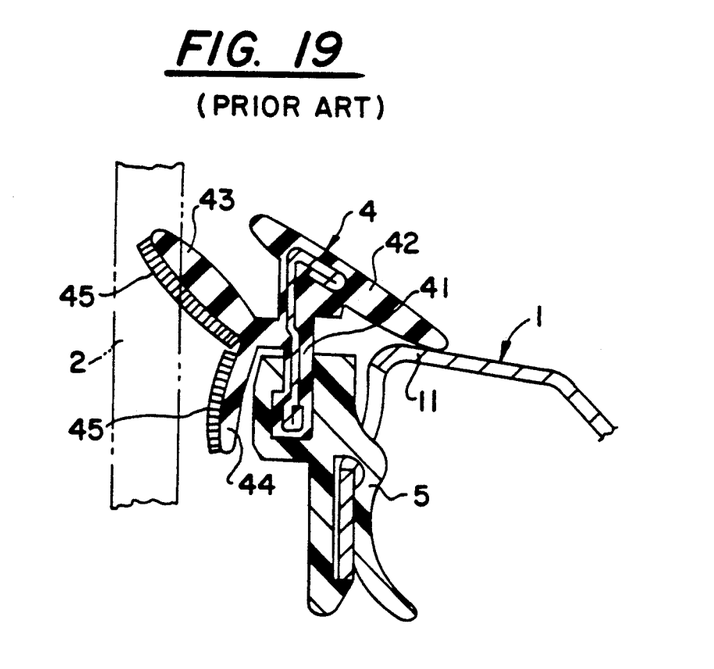
FIG. 19 is a cross-sectional view of a conventional weather strip.

FIG. 19 illustrates one example of the conventional weather strip to be attached along the door belt line 11. In the drawing, a weather strip 4 has a lip 43 which extends obliquely upwardly toward an outer surface of a door glass 2. An end of a lower surface of the lip 43 is pressed on the outer surface of the door glass 2. The weather strip 4 seals between a door outer panel 1 and the outer surface of the door glass 2, and also wipes the outer surface of the door glass 2 when the door glass 2 is raised and lowered. Reference numerals 41, 42 and 44 respectively designate a base portion, a moulding portion and a sub lip.

The weather strip 4 is secured to the door outer panel 1 by a clip 5. The lower surfaces of the lip 43 and an upper surface of the sub lip 44, which respectively face the door glass 2, are given lubricity by forming flocking piles 45 thereon or coating them with lubricant (U.S. Pat. No. 3,742,649).

With this conventional weather strip 4, the end of the lip 43 is brought into contact with the outer surface of the door glass 2. However, the end of the lip 43 contacts the outer surface of the door glass 2 in its lower surface. So, water cannot be completely wiped from the outer surface of the door glass 2. Accordingly, some water is likely to remain thereon. In particular, in the lip 43, water is likely to remain between the flocking piles 45 and the remaining water is likely to adhere to the door glass 2.

SUMMARY OF THE INVENTION

It is an object of the present invention to provide a weather strip by which water and dust adhered to a door glass can be completely wiped when the door glass is raised.

The weather strip in accordance with the present invention has a base portion to be attached along a door belt line of a motor vehicle and a lip extending obliquely upwardly from the base portion toward a door glass. An end of the lip comes into contact with an outer surface of the door glass. A blade extends from the base portion under the lip toward the door glass in a direction nearly perpendicular to the outer surface of the door glass. An end of the blade contacts the outer surface of the door glassl. As the door glass is raised and lowered, the blade turns upwardly and downwardly. A projecting portion is formed at an mid-length of the blade so as to project toward the lip. When the blade turns upwardly, the projecting portion pushes the lip upwardly so that the end of the lip separates from the door glass.

With this weather strip, when the door glass is raised, the end of the lip does not contact the door glass. Only the end of the blade contacts the door glass and completely wipes water therefrom.

Another weather strip in accordance with the present invention has a base portion to be attached along the door belt line of the motor vehicle, a lip which extends from the base portion toward the door glass so that an end thereof does not contact the door glass, and a blade which extends from the base portion under the lip toward the door glass in a direction nearly perpendicular to the outer surface of the door glass so that an end thereof contacts the door glass. Flocking piles are formed on the upper surface of the blade except for an edge of the end. The blade turns upwardly and downwardly as the door glass is raised and lowered.

With this another weather strip, when the door glass is raised, the flocking piles formed on the upper surface of the blade does not contact the door glass. Only a lower edge of the end of the blade contacts the outer surface of the door glass and completely wipes water therefrom.

BRIEF DESCRIPTION OF THE DRAWING

Other objects, features and characteristics of the present invention will become apparent upon consideration of the following description and the appended claims with reference to the accompanying drawings, all of which form a part of this specification.

DETAILED DESCRIPTION OF THE PRESENTLY PREFERRED EXEMPLARY EMBODIMENTS

Figure 1:
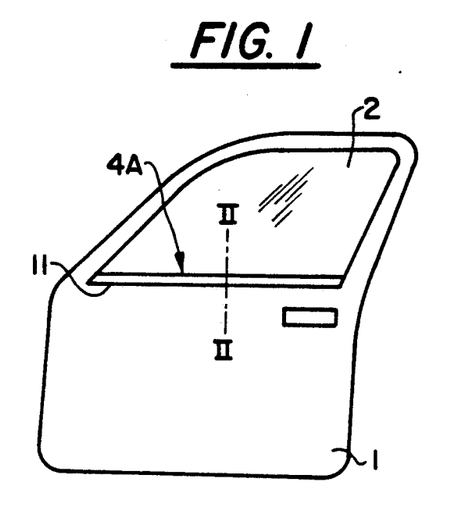
FIG. 1 is a front view of a door of a motor vehicle, to which a first embodiment of a weather strip in accordance with the present invention is attached.
Figure 2:
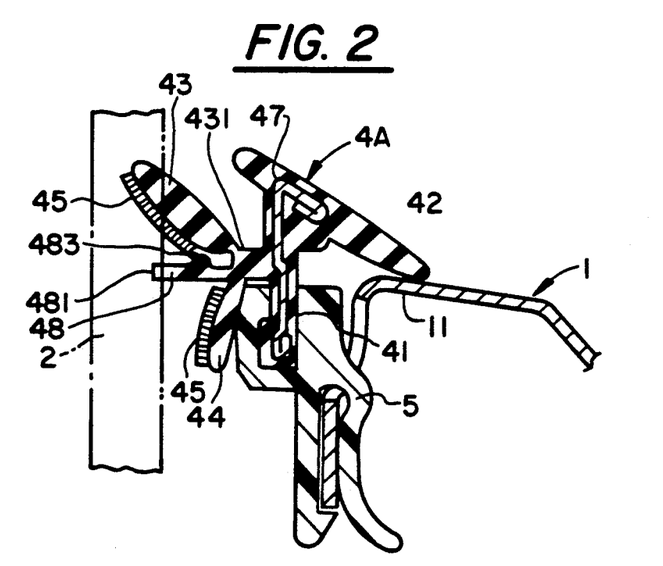
FIG. 2 is a cross-sectional view of the weather strip taken along the line II—II of FIG. 1.
Figure 3:
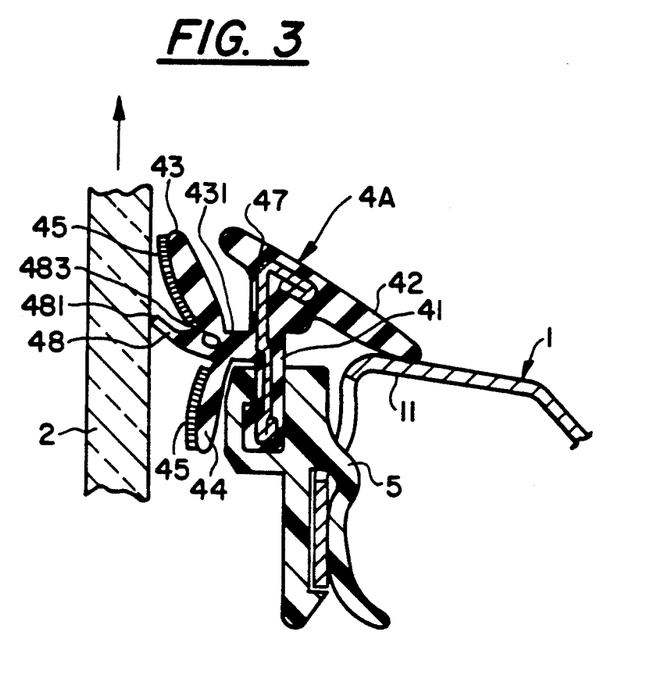
FIG. 3 is a cross-sectional view of the weather strip taken along the same line as FIG. 2, at the time the door glass is raised.

FIGS. 1 through 3 illustrate a first embodiment of a weather strip in accordance with the present invention. In the drawings, a weather strip 4A is composed of an extruded rubber body, and has a base portion 41, moulding portion 2, a lip 43, and a sub lip 44. Flocking piles 45 are formed on the lips 43, 44, respectively. A metal insert 47 is embedded in the weather strip 4A from the base portion 41 to the moulding portion 42. The weather strip 4A is attached to a door outer panel 1 by a clip 5 along a door belt line 11.

In the weather strip 4A of the present embodiment, a notch is formed in the lower surface of a root 431 of the lip 43 so that the lip 43 easily turns about the thin root portion 431. A blade 48 extends from the base portion 42 under the lip 43 in a direction nearly perpendicular to the door glass 2. The blade 48 is of a plate like configuration, and has an end surface 481 which is in nearly parallel with the outer surface of the door glass 2.

At an upper surface of the mid-length of the blade 48, a projecting portion 483 is formed so as to project toward the lower surface of the lip 43.

The remainder of the structure of the weather strip of the present embodiment is identical to that of the conventional weather strip illustrated in FIG. 19.

With the first embodiment having the above-described construction, when the door glass 2 to which rain water or the like is adhered is lowered, most of rain water is wiped by the flock 45 formed on the lower surface of the lip 43. As the door glass 2 is lowered, the blade 48 turns downwardly and an upper edge of the end surface 481 thereof wipes rain water from the outer surface of the door glass 2 almost completely.

Next, when the door glass 2 is raised, the blade 48 turns upwardly, as shown in FIG. 3, and a lower edge of the end surface 481 thereof further wipes the outer surface of the door glass 2, thereby completely removing rain water from the outer surface of the door glass 2. At this time, the projecting portion 483 of the upwardly turned blade 48 pushes the lip 43 upwardly, thereby turning the lip 43 about the thin root portion 431. This results in the end of the lip 43 separating from the outer surface of the door glass 2.

One portion of water wiped from the door glass 2 is likely to remain in the flocking piles 45 of the lip 43, but these flocking piles 45 do not contact the outer surface of the door glass 2 when it is raised. Accordingly, the door glass 2 is raised to its closed position in the completely cleaned state, thereby giving an occupant of the motor vehicle good visibility.

Figure 4:
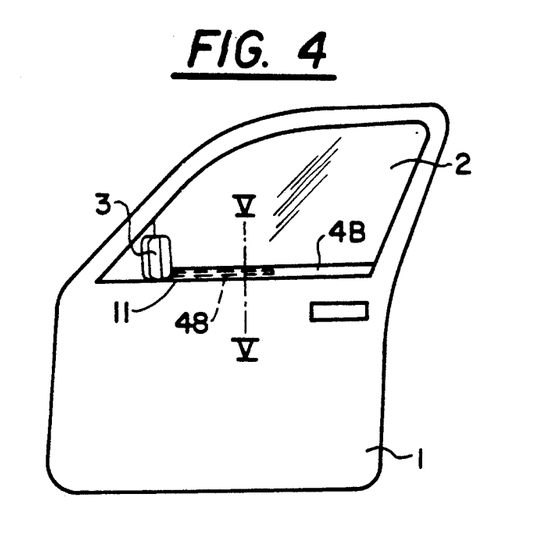
FIG. 4 is a front view of a door of a motor vehicle, to which a second embodiment of the weather strip in accordance with the present invention is attached.
Figure 5:
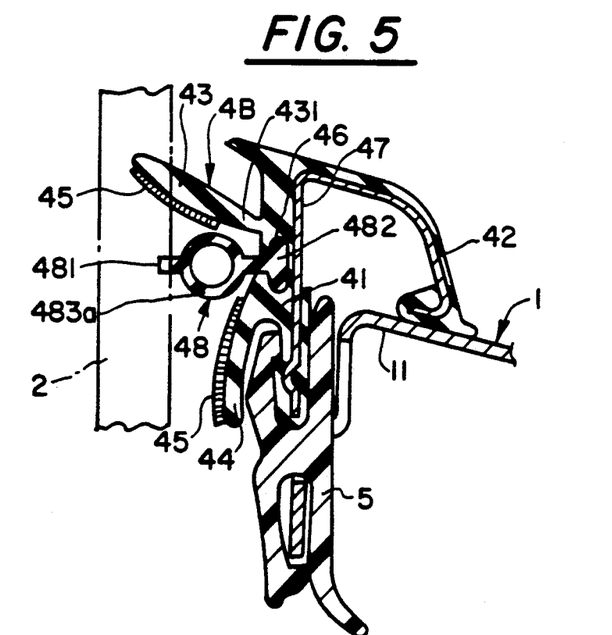
FIG. 5 is a cross-sectional view taken along the line V—V of FIG. 4.
Figure 6:
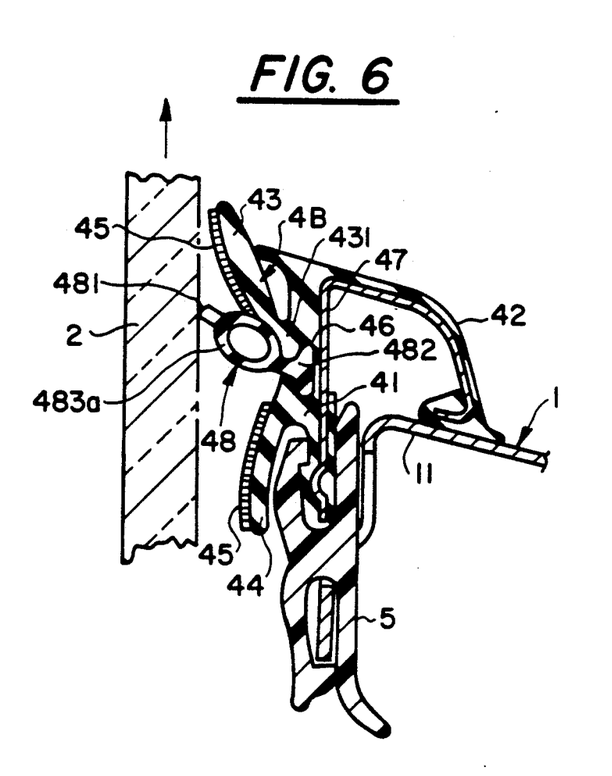
FIG. 6 is a cross-sectional view taken along the same line as FIG. 5, at the same time the door glass is raised.

FIGS. 4 through 6 illustrate a second embodiment of the present invention. With the second embodiment, the blade 48 is an extruded rubber body which is formed separately from the base portion 41 of a weather strip 4B.

The base 482 of the blade 48 is inserted into a groove 46 formed in the base portion 41. An end surface 481 of the blade 48, which is to come into contact with the outer surface of the door glass 2, is in nearly parallel with the outer surface of the door glass 2. A tubular portion 483a having a circular cross-section is formed between the end surface 481 and the base 482. An upper part of the tubular portion 483a is close to the lower surface of the lip 43.

The blade 48 having the above configuration has a length approximately one half of the weather strip 4B, as shown in FIG. 4. The base 482 of the blade 48 is inserted into the groove 46 from a front end of the weather strip 4B to the mid-length thereof.

The thus prepared weather strip 4B is attached to a door outer panel 1. The remainder of the structure of the weather strip of the second embodiment is substantially identical to that of the first embodiment described in reference to FIGS. 2 and 3.

With the second embodiment having the above-described construction, as the door glass 2 to which water such as rain water is adhered is lowered, most of water is wiped by the flocking piles 45 formed at a lower surface of the lip 43. At this time, the blade 48 turns downwardly and the upper edge of the end surface 481 of the blade 48 wipes water from a front half of a door glass 2 (FIG. 4) almost completely.

Next, when the door glass 2 is raised, the blade 48 turns upwardly, as shown in FIG. 6, and the lower edge of the end surface 481 of the blade 48 further wipes the same portion of the door glass 2, thereby completely removing water from this portion.

As the blade 48 turns upwardly, the tubular portion 483a of the blade 48 contacts the lower surface of the lip 43, thereby pusing the lip 43 upwardly. This causes the lip 43 to turn about the thin root portion 431. As a result, the end of the lip 43 separates from the outer surface of the door glass 2. Accordingly, water remaining in the flocking piles 45 of the lip 43 is prevented from being adhered to the outer surface of the door glass 2 when it is raised to its closed position.

Furthermore, the tubular portion 483a of the blade 48 facilitates the turn of the blade 48 when the door glass 2 is raised and lowered, and accordingly decreases the resistance against the upward and downward movement of the door glass 2.

The weather strip 4B of the second embodiment can completely remove water from the front half portion of the door glass 2, thereby improving rearward visibility through a door mirror 3 (FIG. 4).

Figure 7:
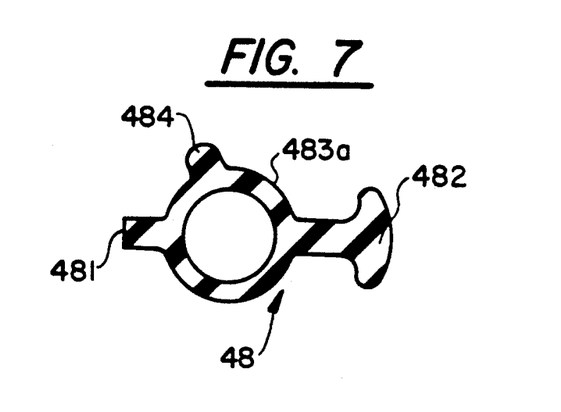
FIG. 7 is a cross-sectional view of a blade assembled in the second embodiment of the weather strip.

FIGS. 7 illustrates a modification of the blade 48 of the second embodiment. A projection 484 is formed on an upper surface of the tubular portion 483a of the blade 48 so as to come into contact with the lip 43. This projection 484 serves to ensure the blade 48 to push the lip 43 upwardly without obstructing the upward and downward turn of the blade 48.

Figure 8:
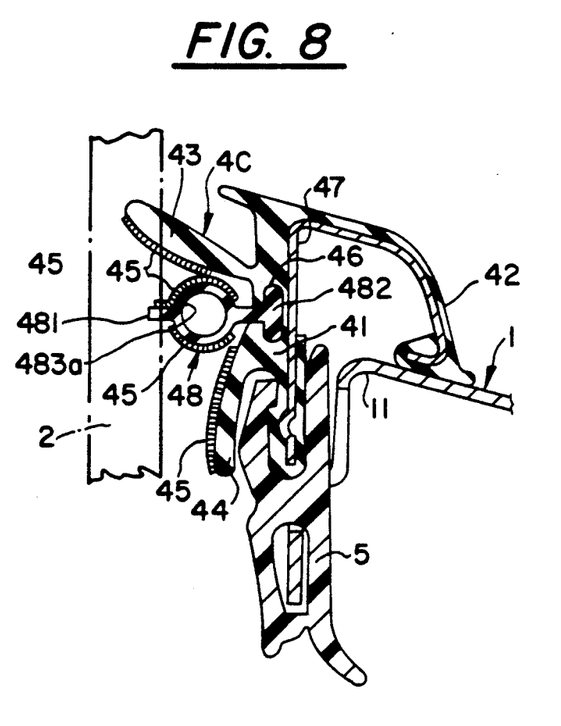
FIG. 8 is a cross-sectional view of a third embodiment of the weather strip in accordance with the present invention.
Figure 9:
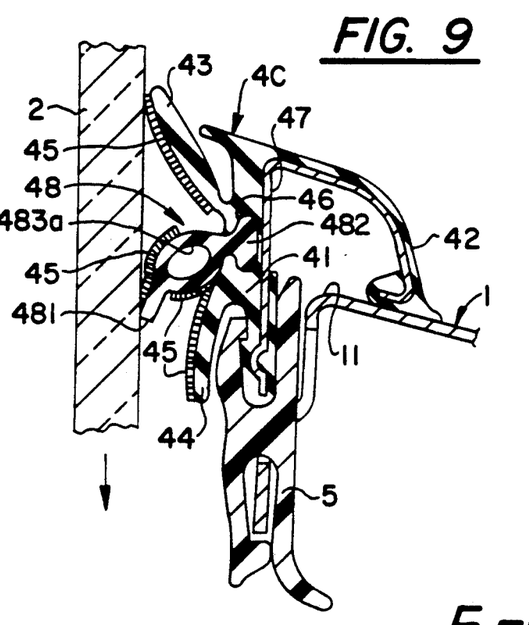
FIG. 9 is a cross-sectional view of the third embodiment of the weather strip at the time the door glass is lowered.
Figure 10:
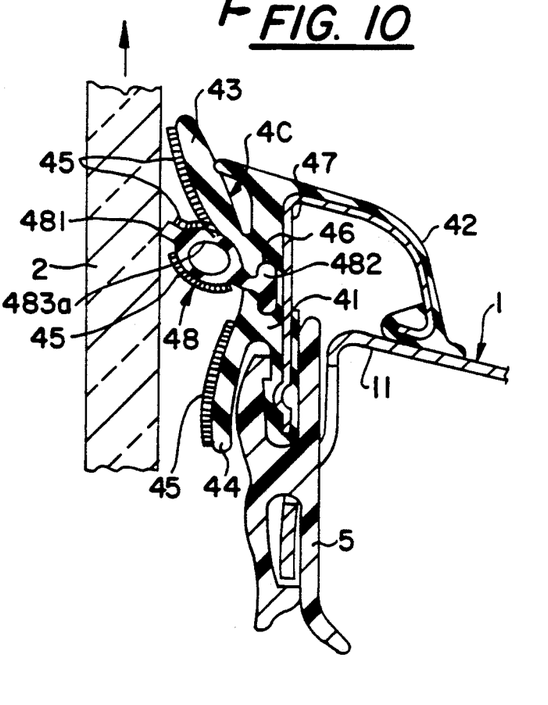
FIG. 10 is a cross-sectional view of the third embodiment of the weather strip at the time the door glass is raised.

FIGS. 8 through 10 illustrate a third embodiment of the weather strip in accordance with the present invention.

With the third embodiment, flocking piles 45 are formed on the upper surface of the blade 48 of a weather strip 4C except for around an upper edge of the end surface 481 thereof. Flocking piles 45 are also formed on the lower surface of the tubular portion 483a. The remaining structure of the third embodiment of the present invention is substantially identical to that of the second embodiment.

As shown in FIG. 9, when the door glass 2 is lowered, most of water and dust on the outer surface of the door glass 2 is wiped by the flocking piles 45 formed on the upper surface of the lip 43. Then, remaining water and dust on the outer surface of the door glass 2 is almost completely wiped by the flocking piles 45 formed on the upper surface of the blade 48, and an upper edge of the end surface 481 of the blade 48. Accordingly, the outer surface of the door glass 2 is prevented from being damaged by the remaining dust which is caught between the outer surface of the door glass 2 and the end surface 481 of the blade 48.

As shown in FIG. 10, when the door glass 2 is raised, water on the outer surface of the door glass 2 is completely removed by the lower edge of the end surface 481 of the blade 48. At this time, the lip 43 is pushed upwardly by the tubular portion 483a of the blade 48, and accordingly, separates from the outer surface of the door glass 2. Therefore, the outer surface of the door glass 2 is prevented from being soiled again by the water and dust remaining in the flocking piles 45 of the lip 43.

The flocking piles 45 need not be necessarily formed on the lower surface of the blade 48. By forming the flocking piles 45 thereon, the following advantages would be obtained.

If the door glass 2 is assembled into the offset position outwardly with regard to the motor vehicle, the tubular portion 483a forcedly presses the door glass 2 when it is raised toward its closed position, thereby increasing the sliding resistance of the weather strip against the door glass 2. However, by forming the flock 45 on the lower surface of the blade 48, this sliding resistance can be reduced.

FIGS. 11 through 14 illustrate a fourth embodiment in accordance with the present invention. With the fourth embodiment, a lip 43a extends from an upper end of the base portion 41 of a weather strip 4D toward the door glass 2. An end of the lip 43a is detached from the outer surface of the door glass 2. The blade 48 is integrally formed with the base portion 41 and extends from the base portion 41 under the lip 43a toward the door glass 2 in a direction nearly perpendicular to the outer surface of the door glass 2. The blade 48 has a tubular portion 483 at its mid-length similarly to the third embodiment. The flocking piles 45 are formed on each of the upper surface and the lower surface of the tubular portion 483 except for around the end surface 481 of the blade 48. The blade 48 has such a height that a top part of the tubular portion 483 does not contact the lip 43a when the blade 48 turns upwardly.

Figure 11:
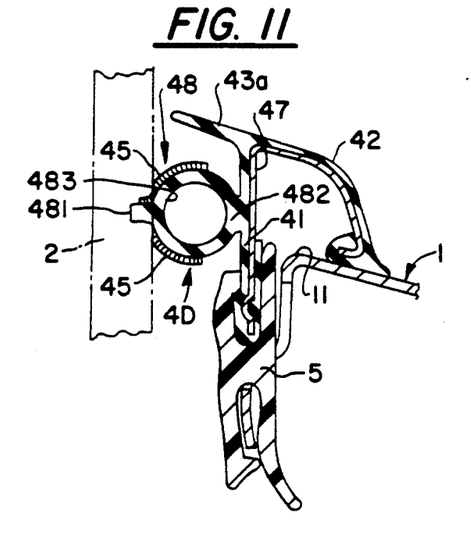
FIG. 11 is a cross-sectional view of a fourth embodiment of the weather strip in accordance with the present invention.

The remaining construction of the fourth embodiment is substantially identical to that of the third embodiment.

Figure 12:
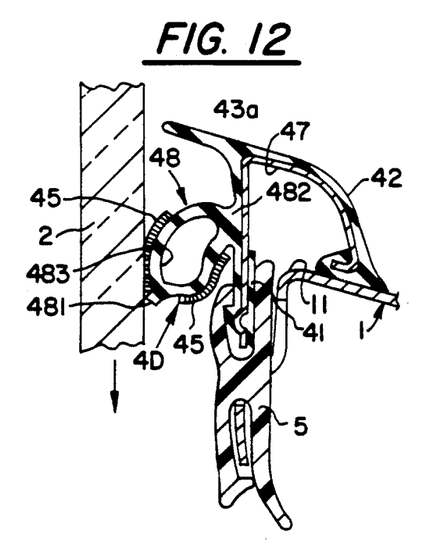
FIG. 12 is a cross-sectional view of the fourth embodiment of the weather strip at the time the door glass is lowered.

When the door glass 2 is lowered to open position, as shown in FIG. 12, the blade 48 turns downwardly and the flocking piles 45 on the upper surface of the blade 48 wipe most of water and dust from the outer surface of the door glass 2. Then, the upper edge of the end surface 481 of the blade 48 almost completely removes the water and dust therefrom.

Figure 13:
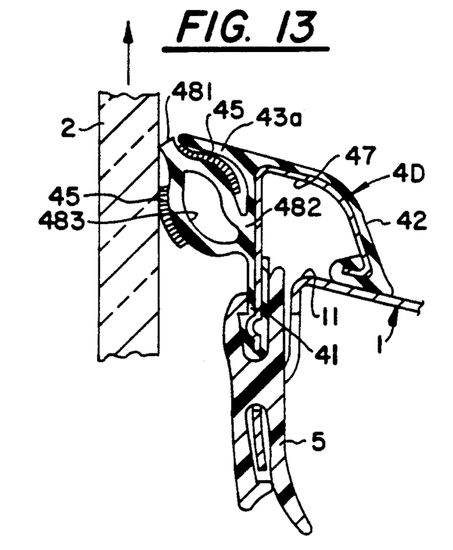
FIG. 13 is a cross-sectional view of the fourth embodiment of the weather strip at the time the door glass is raised.

Next, when the door glass 2 is raised to closed position, as shown in FIG. 13, the blade 48 turns upwardly and the flocking piles 45 on the lower surface of the blade 48 and the lower edge of the end surface 481 of the blade 48 completely remove water and dust from the outer surface of the door glass 2.

The lip 43a extending over the blade 48 covers it, thereby maintaining good outer appearance around the door belt line 11.

Figure 14:
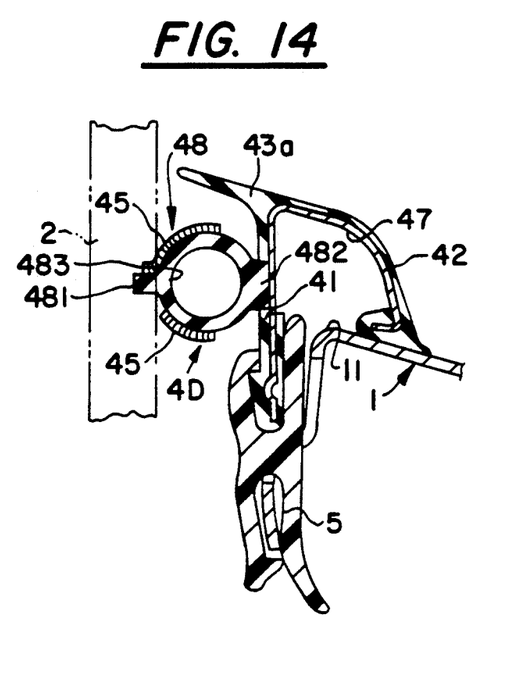
FIG. 14 is a cross-sectional view of a modified embodiment of the weather strip of FIG. 11.

FIG. 14 illustrates a modification of the weather strip of the fourth embodiment. In the drawing, the blade 48 is formed separately from the base portion 41, and is attached to the base portion 41 by fitting or bonding with adhesives. The base portion 41 and the lip 43a are integrally formed of EPDM, for example. The blade 48 is made of diene rubber. The end surface 481 of the blade 48 is given lubricity by chlorination. By giving the end surface 481 of the blade 48 lubricity, the sliding resistance of the blade 48 against the moving door glass 2 can be reduced.

Figure 15:
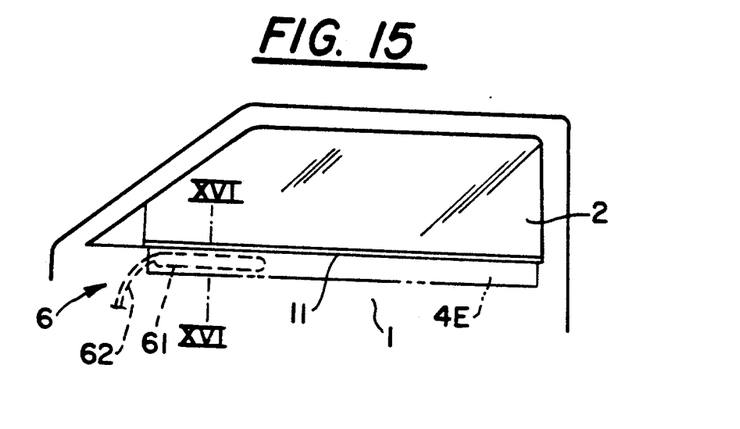
FIG. 15 is a front view of a door of a motor vehicle to which a fifth embodiment of a weather strip in accordance with the present invention is attached.
Figure 16:
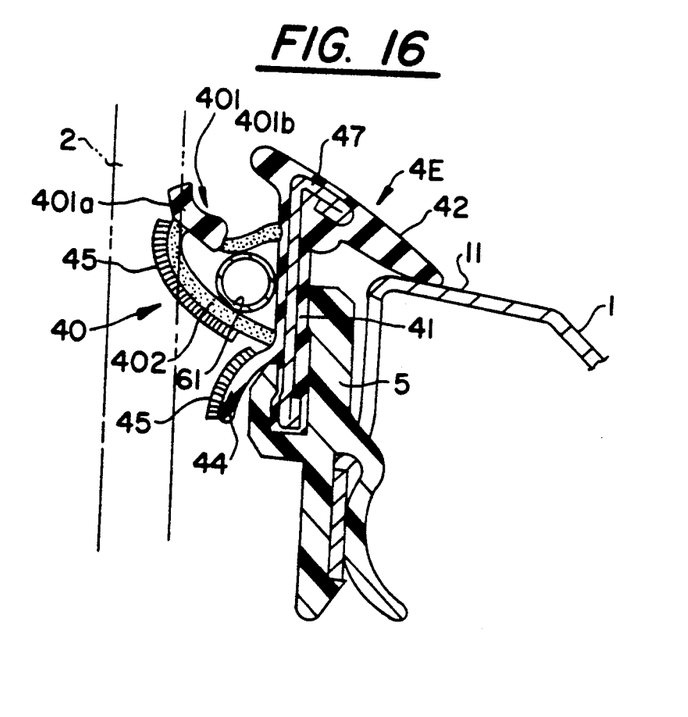
FIG. 16 is a cross-sectional view taken along the line XVI—XVI of FIG. 15.

FIGS. 15 and 16 illustrate a fifth embodiment of a weather strip in accordance with the present invention. In the drawings, a tubular blade 40 projects from the base portion 41 of a weather strip 4E. A sub lip 44 on which the flocking piles 45 are formed projects from the base portion 41 under the blade 40.

The tubular blade 40 is composed of a lip 401 having a V-shaped cross-section, and a gently curved side wall 402. The lip 401 extends from the base portion 41 toward the door glass 2, and an end portion 401a extends obliquely upwardly and serves as a blade. The side wall 402 connects the mid-length of the end portion 401a of the lip 401 to the base portion 41. The weather strip 4E is an extruded body, the base 401b of the lip 401 and the side wall 402 are made of sponge rubber while the remaining portions are made of solid rubber. The flocking piles 45 are formed on the side wall 402. An end surface of the lip 401 is a cut surface having angular edges on both sides thereof.

Figure 17:
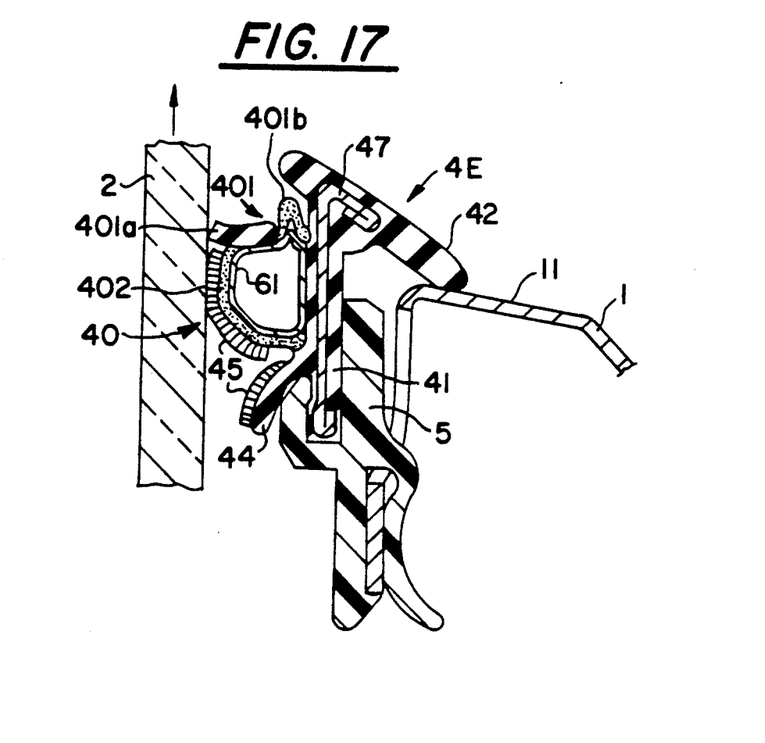
FIG. 17 is a cross-sectional view of the fifth embodiment of the weather strip at the time the door glass is raised.

In the free state of the tubular blade 40, as shown in FIG. 16, the flocking piles 45 on the side wall 402 protrudes from the edge of the end surface of the lip 401 toward the door glass 2. The lip 401 has such a width that both one edge of the end surface of the lip 401 and the flocking piles 45 formed on the side wall 402 contact the outer surface of the door glass 2 when the lip 401 is deformed so as to extend in a direction perpendicular to the outer surface of the door glass 2, as shown in FIG. 17. Instead, the lip 401 may have such a width as to solely contact the outer surface of the door glass 2.

Figure 18:
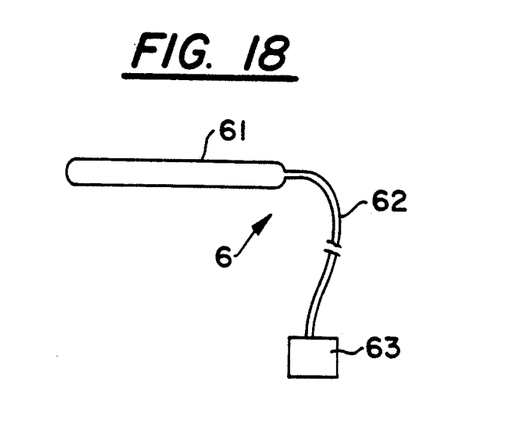
FIG. 18 is a schematic diagram of an actuator used in the fifth embodiment of the weather strip.

A tube 61 of rubber is inserted into a front half portion of the tubular blade 40, as shown in FIGS. 15 and 16. By supplying air into the tube 61, the tube 61 is expanded, thereby deforming the blade 40, as shown in FIG. 17. As shown in FIG. 18, the tube 61 is closed at one end thereof, and the other end thereof is connected to a compressor 63 by way of a hose 62, thereby composing an actuator 6. The compressor 63 is operated by turning on or off a switch (not shown) provided in a vehicle compartment.

The remainder of the structure of the fifth embodiment is identical to that of the preceding embodiment.

With the fifth embodiment having the above construction, when the door glass 2 is raised or lowered in order to open or close the door glass 2, the end of the lip 401 does not contact the outer surface of the door glass 2. Only the flocking piles 45 formed on the side wall 402 contact the outer surface of the door glass 2, as shown in FIG. 16. Accordingly, the sliding resistance of the blade 40 against the moving door glass 2 can be reduced.

Whereas, when the door glass 2 is raised or lowered in order to remove water and dust from the outer surface of the door glass 2, the compressor 63 is operated to supply air into the tube 61. The tube 61 is expanded by the supplied air, as shown in FIG. 17, thereby pushing the base 401b of the lip 401 upwardly. This causes the end portion 401a of solid rubber to change its extending direction into the direction nearly perpendicular to the outer surface of the door glass 2. The end of the lip 401 protrudes towards the door glass 2 relative to the flock 45 formed on the side wall 402 and a lower edge of the end surface of the lip 401 contacts the outer surface of the door glass 2. The lower edge of the end surface of the lip 401 completely removes water and dust from the front half portion of the door glass 2, which is particularly required to have a good visibility.

What is claimed is:

1. A weather strip to be attached along a belt line of a door of a motor vehicle for wiping out an outer surface of a door glass when the door glass is raised and lowered, comprising:
   a base portion to be attached along the belt line of a door outer panel;
   a lip extending from said base portion obliquely upwardly toward the door glass so that an end of said lip contacts the outer surface of the door glass;
   a blade extending from said base portion under said lip in a direction of the outer surface of the door glass, an end of said blade contacting the outer surface of the door glass, whereby said blade turning upwardly and downwardly when the door glass is raised and lowered; and
   a projecting portion formed on an upper surface of said blade for pushing up a lower surface of said lip when said blade turns upwardly, whereby said end of said lip is detached from the outer surface of said door glass.

2. The weather strip according to claim 1, wherein said lip has a thin portion at a root of said lip so that said lip is turnable about said thin portion.

3. The weather strip according to claim 1, wherein flocking piles are formed on a lower surface of said lip.

4. The weather strip according to claim 1, wherein said blade has a plate like shape, and said end of said blade, which contacts the outer surface of said door glass, has angular edges at both sides of said end surface thereof.

5. The weather strip according to claim 4, wherein said blade has a tubular portion having a nearly circular cross-section at a mid-length of said blade, said tubular portion has a diameter larger than the thickness of the remaining portion of said blade, and an upper half part of said tubular portion composing said projecting portion.

6. The weather strip according to claim 5, wherein flocking piles are formed on an upper surface of said blade except for around an upper edge of an end surface of said blade for contacting the outer surface of the door glass when the door glass is lowered.

7. The weather strip according to claim 1, wherein said lip, said blade and said base portion are composed of an integral extruded body.

8. The weather strip according to claim 1, wherein said blade and said base portion are separately extruded bodies, and a base of said blade is connected to said base portion.

9. A weather strip to be attached along a belt line of a door of a motor vehicle for wiping an outer surface of a door glass when the door glass is raised and lowered, comprising:
   a base portion to be attached along the belt line of a door outer panel;
   a lip extending from an upper end of said base portion toward the door glass so that an end of said lip does not contact the outer surface of the door glass; and
   a blade extending from said base portion under said lip toward the door glass in a direction of the outer surface of the door glass, an end of said blade contacting the outer surface of the door glass, whereby said blade turns upwardly and downwardly when the door glass is raised and lowered.

10. The weather strip according to claim 9, wherein said blade has a tubular portion at its mid-length, an end portion of said blade has a plate like shape and has angular edges of both sides of an end surface.

11. The weather strip according to claim 9, wherein a flock is formed on an upper surface of said blade so as to contact the outer surface of the door glass when the door glass is lowered.

* * * * *